US010518598B1

(12) United States Patent
Shaikh et al.

(10) Patent No.: US 10,518,598 B1
(45) Date of Patent: Dec. 31, 2019

(54) STRUT BEARING INTEGRATION

(71) Applicant: SCHAEFFLER TECHNOLOGIES AG & CO. KG, Herzogenaurach (DE)

(72) Inventors: Shakeel Shaikh, Windsor (CA); Kunal Vidyasagar, Troy, MI (US); Bogyu Kang, Rochester Hills, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/176,076

(22) Filed: Oct. 31, 2018

(51) Int. Cl.
*F16C 19/10* (2006.01)
*B60G 15/06* (2006.01)

(52) U.S. Cl.
CPC ............ *B60G 15/067* (2013.01); *F16C 19/10* (2013.01); *B60G 2204/12* (2013.01); *B60G 2204/418* (2013.01); *F16C 2326/05* (2013.01)

(58) Field of Classification Search
CPC .... F16C 19/10; F16C 19/163; F16C 33/7886; F16C 35/07; F16C 2326/05; B60B 15/067; B60B 2204/12; B60B 2204/418
See application file for complete search history.

(56) References Cited

U.S. PATENT DOCUMENTS

| 8,876,399 | B2 | 11/2014 | Lutz et al. | |
|---|---|---|---|---|
| 9,856,917 | B1* | 1/2018 | Vidyasagar | B60G 15/068 |
| 2011/0187071 | A1* | 8/2011 | Corbett | B60G 15/068 280/124.155 |
| 2013/0313766 | A1* | 11/2013 | Bussit | B60G 15/068 267/195 |
| 2016/0146253 | A1* | 5/2016 | Weiss, II | F16F 9/54 188/321.11 |
| 2018/0023626 | A1* | 1/2018 | Yano | F16C 19/10 384/607 |
| 2018/0274587 | A1* | 9/2018 | Yano | F16C 19/10 |

* cited by examiner

*Primary Examiner* — Phillip A Johnson
(74) *Attorney, Agent, or Firm* — Brooks Kushman P.C.

(57) ABSTRACT

A suspension strut bearing includes a top mount. The top mount is coupled to a guidance ring, wherein relative rotation or oscillation between the guidance ring and the top mount is enabled via rolling elements between an upper raceway and a lower raceway. The top mount has a top mount plate with an internal seal and an external seal. Both seals are overmolded to the top mounted plate and inhibit debris or the like from interfering with the operation of the rolling elements in the raceways. By overmolding the seals, a separate cap is no longer needed to be part of the suspension strut bearing. Further, the upper raceway can be integrated into the top mount plate itself. For example, the top mount plate can be shaped or formed to take the shape of the upper raceway, rather than having a separate element attached to the top mount plate.

15 Claims, 5 Drawing Sheets

STRUT BEARING INTEGRATION

TECHNICAL FIELD

The present disclosure relates to a bearing for a strut assembly for a vehicle.

BACKGROUND

Vehicles have suspension systems that allow the wheels to follow elevational changes in the road surfaces while dampening wheel and body motion. When the vehicle encounters a rise in the surface of the road, the suspension enables the wheel to move upwardly relative to the vehicle frame. Likewise, when the vehicle encounters a dip in the surface of the road, the suspension enables the wheel to move downwardly relative to the vehicle frame. A spring can be incorporated with the body structure in order to provide a resilient response to the relative vertical movement, and a shock absorber or strut may be placed at the wheel to dampen wheel and body motion. A MacPherson strut assembly is known in the art for performing these functions.

Strut bearings are commonly used in MacPherson strut assemblies. The strut bearing is mounted on one side to a top mount, which is rigidly secured to the vehicle frame. The strut bearing is also mounted on another side to a spring.

U.S. Pat. No. 8,876,399 discloses a suspension strut bearing having a cap, a guide ring, and a thrust bearing (having rolling elements between two raceways) arranged between the cap and the guide ring. The cap, the guide ring, and the thrust bearing are all press-fitted on the top mount.

SUMMARY

In one embodiment, a suspension strut bearing includes a top mount including a plate configured to mount to a vehicle frame. An upper raceway is on a lower side of the top mount and extends about an axis. A guidance ring is configured to oscillate relative to the top mount about the axis. A lower raceway is on an upper side of the guidance ring. A plurality of rolling elements contact the upper raceway and the lower raceway to enable relative oscillation between the top mount and the guidance ring about the axis. An internal seal is located radially inwardly of the rolling elements. An external seal is located radially outwardly of the rolling elements. The internal seal and the external seal are overmolded to the top mount.

In another embodiment, a suspension strut bearing includes a top mount including a stamped steel plate configured to mount to a vehicle frame. The stamped steel plate has a lower surface formed with a shape defining a first raceway. A guidance ring is configured to oscillate relative to the top mount about an axis. A second raceway is coupled to the guidance ring. A plurality of rolling elements contact the first raceway and the second raceway such that the top mount directly contacts the rolling elements.

In yet another embodiment, a suspension strut bearing includes a top mount configured to mount to a vehicle frame. A guidance ring is configured to oscillate relative to the top mount about an axis. A lower raceway is disposed on an upper side of the guidance ring. A plurality of rolling elements are between the top mount and the lower raceway and are configured to enable relative oscillation between the top mount and the guidance ring. An internal seal is located radially inwardly of the rolling elements. An external seal is located radially outwardly of the rolling elements. At least one of the internal seal and the external seal are overmolded to the top mount.

DETAILED DESCRIPTION

Figure 1:
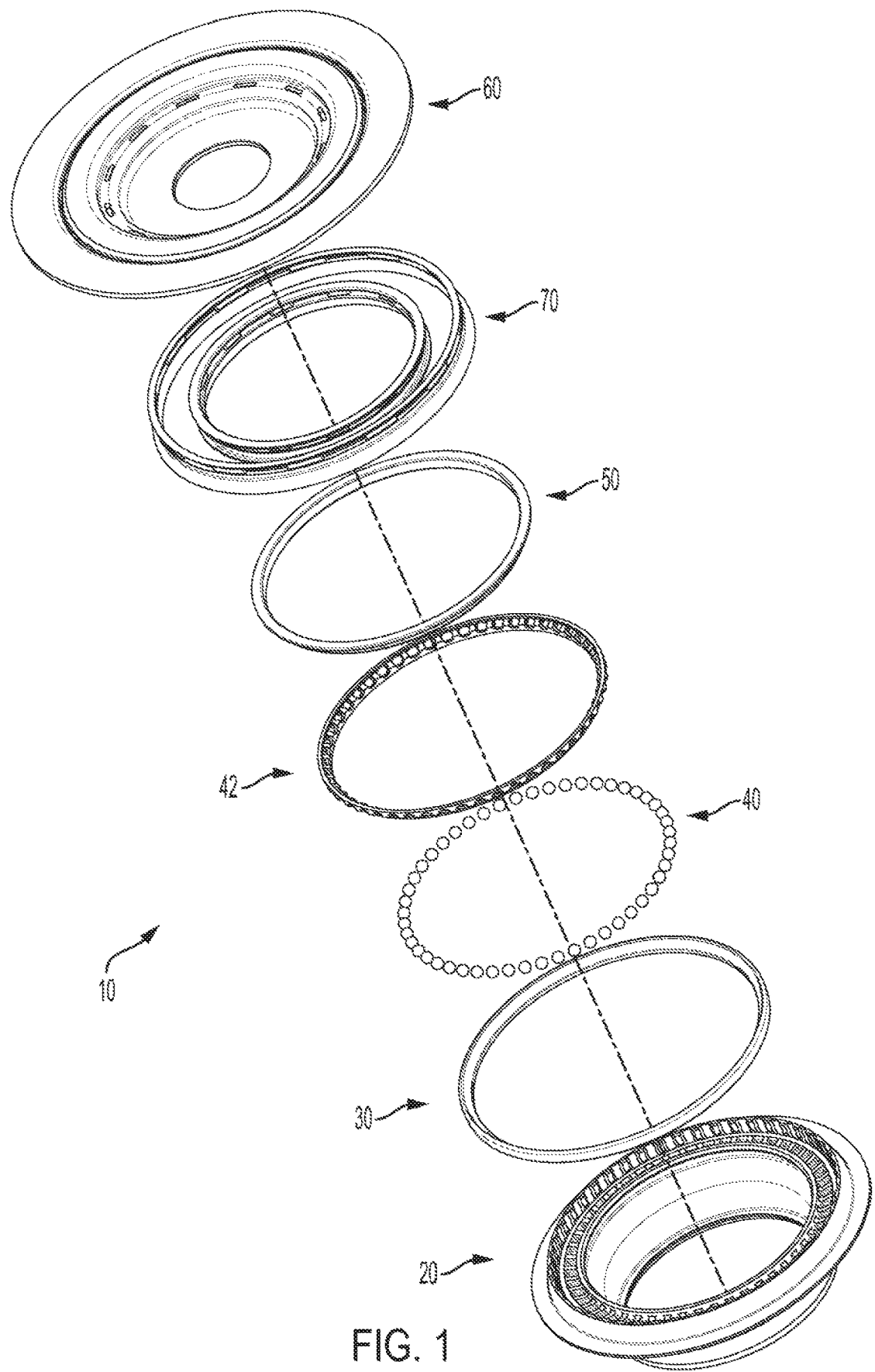
FIG. 1 is an exploded perspective view of a strut bearing for a suspension component, such as a MacPherson strut assembly, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surface faces away from the central axis, or is outboard of another "inner" surface. Terms such as "radial," "diameter," "circumference," etc. also are relative to the central axis. The term "axial" can mean extending along the center axis, or extending in a direction parallel to the center axis. The term "radial" can mean a direction perpendicular to the axial direction. The term "circumferential" can mean a direction about the axis, like a circumference of a circle. Moreover, the terms "upper," "top," "lower" and "bottom" may refer to a part in its illustrated orientation shown in the Figures.

As explained in the background, strut bearings are commonly used for MacPherson strut assembly modules in passenger cars. The strut bearing is mounted on one side to a top mount, which is rigidly secured to the vehicle frame. The strut bearing is also mounted on another side to a spring. A plastic cap is overmolded to sit between the top mount plate and the thrust bearing. Typically, the top mount is manufactured by (or separately provided to) the vehicle OEMs and is rigidly attached to the vehicle frame. The bearing assembly (including upper and lower raceways, rolling elements, and optional cage) is then assembled to the top mount and spring. For example, U.S. Pat. No. 8,876,399 discloses a suspension strut bearing having a cap, a guide ring, and a thrust bearing (having rolling elements between two raceways) arranged between the cap and the guide ring. The cap, the guide ring, and the thrust bearing are then fixed on the top mount. This can create several steps of assembly. For example, this may require the supplier to supply a preassembly of the thrust bearing, guide ring, and cap to the OEM, whereby the OEM then assembles the thrust bearing, guide ring, and cap to the top mount. Also, some strut bearings have the cap or guide ring consisting of a harder plastic and a separate softer seal material. Making of such components requires overmolding or two-shot molding processes. Reduction of parts and fewer steps of assembly may be desirable.

According to various embodiments described herein, a strut bearing is provided with fewer components and requires fewer steps of assembly. The top mount plate, which can be metal such as steel or aluminum, can be provided with bearing seals overmolded directly into the top mount plate. This allows the top mount plate to have an integrated upper raceway incorporated directly in the top mount plate, eliminating a separate upper raceway component. The top mount plate thus includes or defines the upper raceway itself, so that the top mount is actually part of the bearing itself. Thus, suppliers are able to preassemble the entire bearing and top mount assembly prior to its final assembly onto the vehicle frame. Any sort of cap (e.g., harder plastic) such as that disclosed above can be removed as unnecessary.

FIG. 1 shows a suspension strut bearing 10 (also referred to as a bearing or strut bearing) according one embodiment of this disclosure that accomplishes these and other goals. The bearing 10 has various components that extend about an axis 11. The bearing 10 can be configured to be part of a MacPherson strut assembly for a passenger vehicle. As shown in FIG. 1, the bearing may include the following components that will be described in additional detail below: a guidance ring 20, a lower raceway 30, rolling elements 40, an upper raceway 50, and a top mount plate 60 with an integrated seal 70 (that may be overmolded onto the top mount plate 60, but is shown in FIG. 1 as separated from the top mount plate 60 for illustrative purposes). Also for illustrative purposes, a cage 42 is not illustrated in FIG. 1 but may be provided, as shown in the remaining figures. The top mount plate 60 may be combined with the integrated overmolded seal 70 as part of what can more generally be referred to as a top mount.

Figure 2:
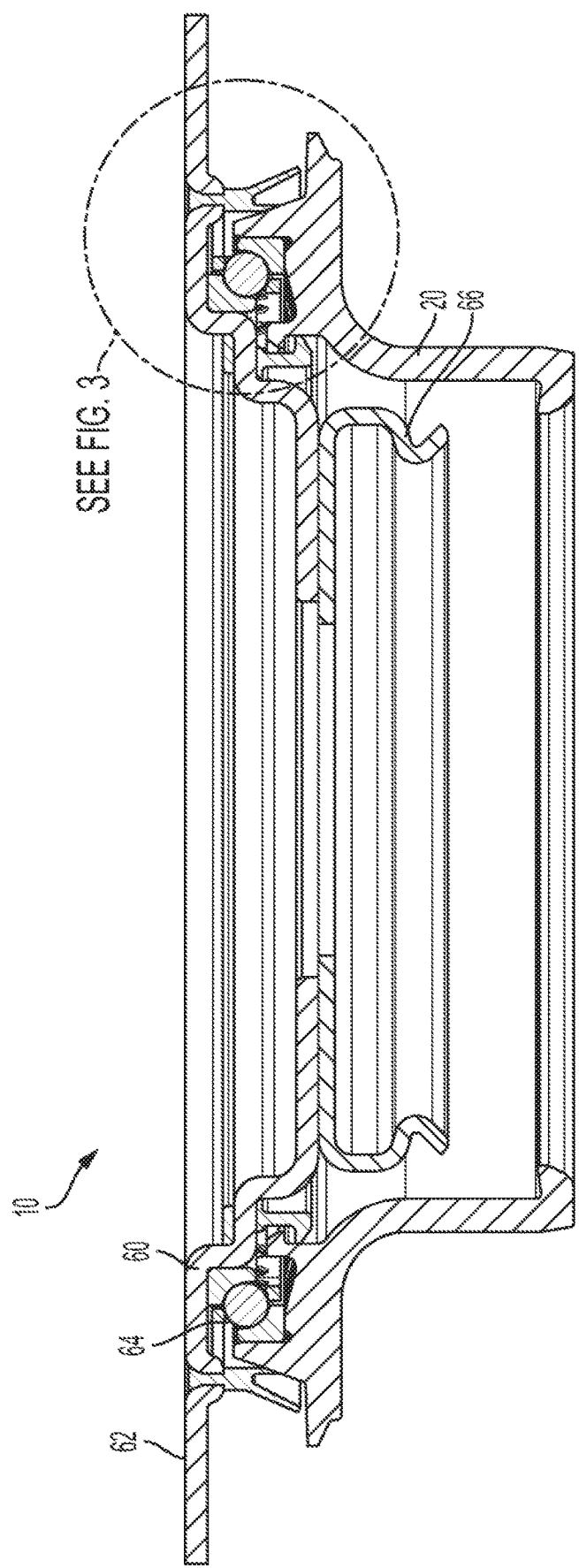
FIG. 2 is a cross-sectional view of an assembled suspension strut bearing, according to one embodiment.
Figure 3:
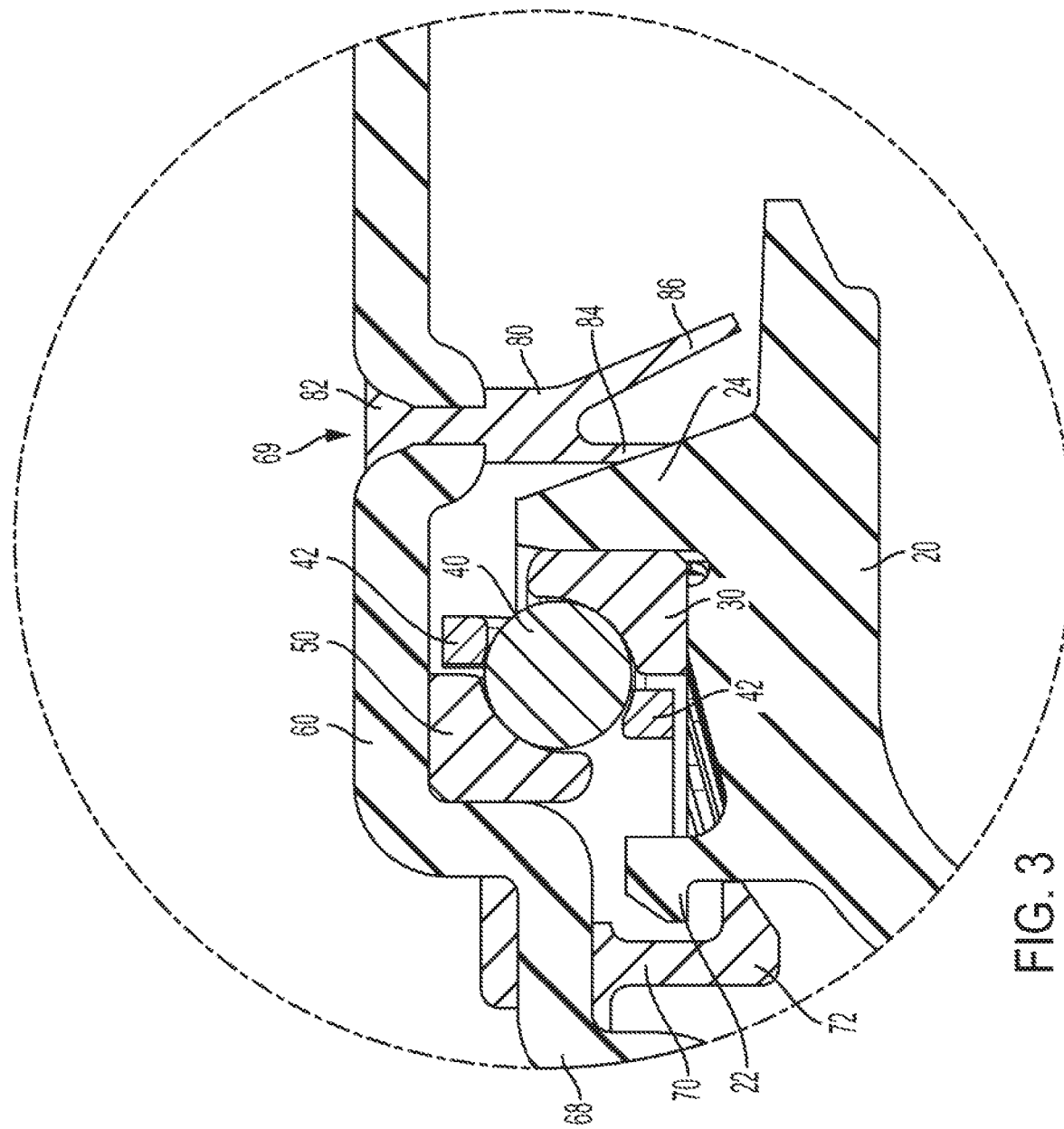
FIG. 3 is an enlarged view of a portion of FIG. 2, as labeled in FIG. 2.

FIG. 2 shows a cross section of the strut bearing 10 in an assembled state, and FIG. 3 shows an enlarged view of a region of FIG. 2 for additional clarity. Referring to FIGS. 1-3, the top mount plate 60 has an upper surface 62 configured to mount to attach to NVH components of a top mount (such as dampeners, etc.) which are attached to a vehicle frame. Opposing the upper surface 62 of the top mount plate 60 is a lower surface 64 of the top mount plate 60. The top mount plate 60 can be made of metal (e.g., steel) and can be stamped to shape. For example, the top mount plate 60 may be stamped to have various shoulders or levels. A flange 66 may be formed with or fixed to the top mount plate 60. The flange 66 may be provided to attach the strut bearing 10 to another strut component (not illustrated). The flange 66 may also act as a bump stop for the damper of the suspension rod of the strut assembly to limit maximum displacement of the rod.

The top mount plate 60 is coupled to the guidance ring 20, and a bearing (where the rolling elements 40 reside) is provided between the top mount plate 60 and the guidance ring 20 to enable relative rotation or oscillation therebetween. The relative rotation may be limited to 45 degrees in either direction about the center axis, and therefore the relative rotation that may occur quickly may be referred to as oscillation. In one embodiment such as that illustrated in FIG. 3, the lower raceway 30 is mounted or otherwise attached to the guidance ring 20. The lower raceway 30 may be metal and bonded with a press fit (for example) to the guidance ring 20. The upper raceway 50 may likewise be metal and similarly attached to the lower surface 64 of the top mount plate 60. As will be described with respect to a second embodiment shown in FIGS. 4-5, the upper raceway can also be integrated with the top mount plate 60, such that the lower surface 64 of the top mount plate 60 is formed with the shape of the upper raceway.

Referring back to FIGS. 1-3, a plurality of rolling elements 40 are located between the lower raceway 30 and the upper raceway 50. The rolling elements 40 may be spheres, cylinders, or other shapes known in the art. In another embodiment, the rolling elements are replaced with a single solid disk that can form a plain bearing. A bearing cage 42 may be provided that interconnects the rolling elements 40 and maintains separation between adjacent rolling elements 40. For example, the bearing cage 42 may be an annular member with circumferentially-arranged cavities, each cavity for housing one of the rolling elements 40.

The bearing 10 is also provided with seals to fluidly isolate the rolling elements 40 and the raceways 30, 50 from the external environment and other fluids. For example, an internal seal 70 seals the rolling elements 40 from the interior of the top mount plate 60, and an external seal 80 seals the rolling elements 40 from the exterior of the top mount plate 60. Each of the seals 70, 80 may be overmolded to the top mount plate 60, and can be made of rubber or plastic such as a thermoplastic elastomer (TPE) or a thermoplastic polyurethane (TPU).

The internal seal 70, also referred to as an inner diameter (ID) seal, secondary seal or a locking tab, can be directly overmolded to a dedicated stepped portion 68 of the top mount plate 60. As such, part of the material of the internal seal 70 may extend above the upper surface 62 of the top mount plate 60. The internal seal 70 includes a flange, tab, or projection (hereinafter referred to as a tab 72) that extends radially outwardly therefrom. The tab 72 is in contact with and engages the guidance ring 20. The guidance ring 20 may have a corresponding tab 22 that extends radially inwardly therefrom. The tab 22 may be located above (e.g., more toward the top mount plate 60) than the tab 72. The vertical gap between the tab 22 and the 72 may be exaggerated in this drawing for illustrative purposes. The engagement of the tab 22 with the tab 72 creates a seal to prevent debris, fluid, or other material from entering the region of the bearing 10 where the rolling elements 40 engage the raceways, which may be provided with its own lubricant. The overlap between the tabs 22, 72 also acts as a lock tab or retaining feature to hold the top mount plate 60 and guidance ring 20 together.

The external seal 80 can also be directly overmolded to the top mount plate 60. In one embodiment, the top mount plate 60 is provided with apertures or an annular groove 69 where the external seal 80 engages during the overmolded process. As such, a portion of the seal 80 can extend at least partially through the groove 69, whereupon it dimensionally expands at location 82 to secure the seal 80 to the top mount plate 60.

The external seal 80 includes a pair of spaced-apart lips, namely a contacting lip 84 and a deflecting lip 86. The guidance ring 20 includes a projection 24 extending toward the top mount plate 60 that contacts and engages the contacting lip 84 to create a seal. The projection 24 includes an inwardly-facing surface that contacts the lower raceway 30, and an outwardly-facing surface that contacts the contacting lip 84. The deflecting lip 86 extends slightly outwardly and downwardly such that it is only slightly spaced from the guidance ring 20. This arrangement allows the deflecting lip 86 to deflect debris, fluid, or other material away from the region of the bearing where the rolling elements 40 engage the raceways. In some cases of extreme environmental conditions, the deflective lip 86 can be made as a secondary seal by extending the length further such that it contacts the guidance ring 20.

The upper raceway 50 is described above as being bonded or otherwise attached to the top mount plate 60. However, according to another embodiment, the top mount plate 60 can be stamped during production to incorporate the shape of the upper raceway. In other words, the top mount plate 60 may include the upper raceway as an integral component thereof. This is made possible with the addition of the overmolded seals 70, 80 described above. This removes a part from the bearing 10, reducing cost and assembly time. This is also shown in the embodiment illustrated in FIGS. 4-5, described below.

Figure 4:
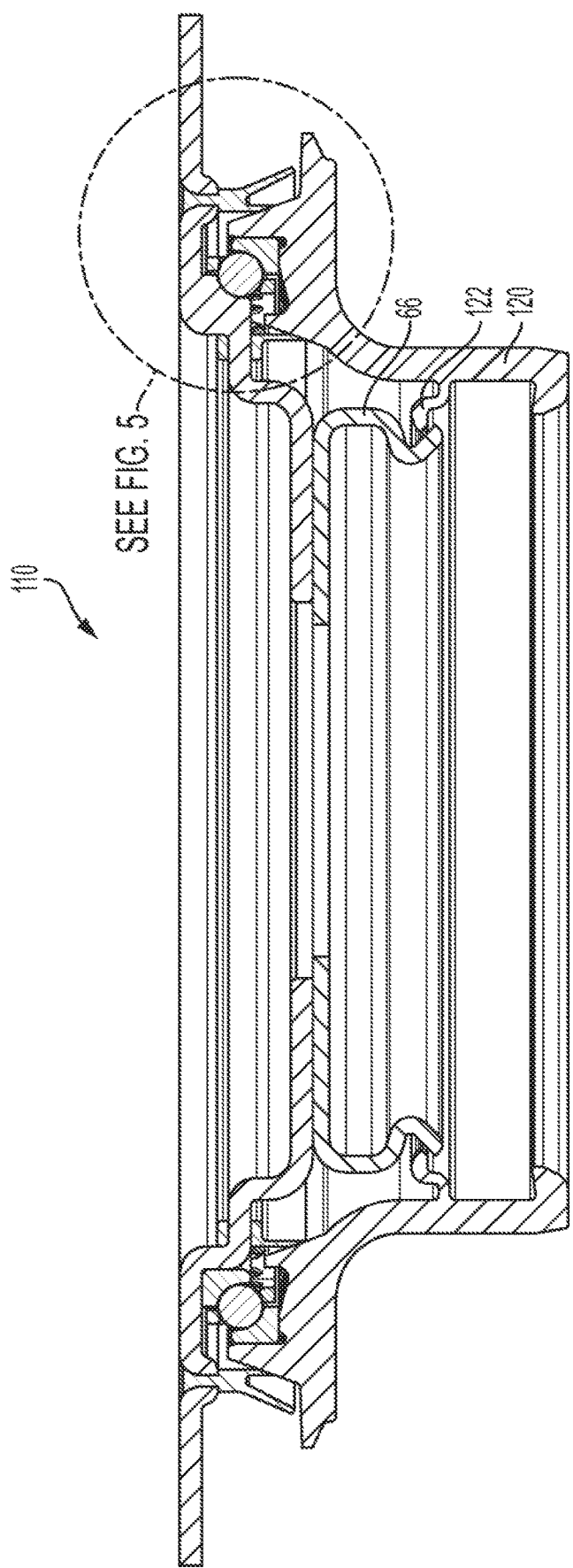
FIG. 4 is a cross-sectional view of an assembled suspension strut bearing, according to another embodiment.
Figure 5:
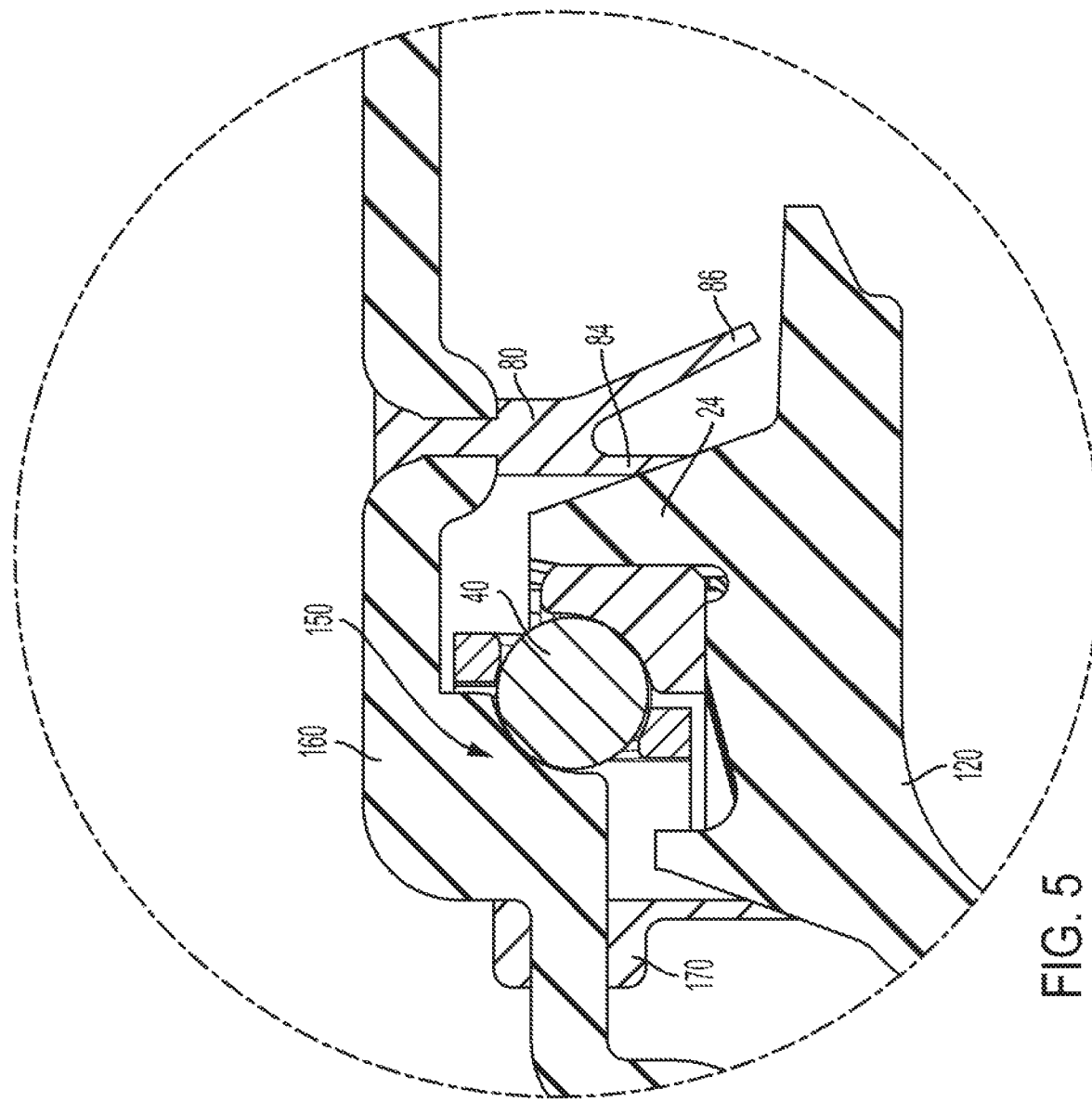
FIG. 5 is an enlarged view of a portion of FIG. 4, as labeled in FIG. 4.

Another embodiment of a bearing 110 is illustrated in FIGS. 4-5, in which similar components are shown with reference numbers that increase by 100 and may include similar features as the first embodiment unless otherwise explained. In this embodiment, the tab 22 from FIGS. 1-3 has been moved downward to location 122. The tab 122 extends radially inwardly from the guidance ring 120 and cooperates with the flange 66 of the top mount plate 160. The cooperation of the tab 122 with the flange 66 inhibits or diverts a portion of the debris or fluid within the interior of the bearing 110 from entering the bearing region where the rolling elements 40 reside. This provides a diverter function integrated into the top mount plate 160 itself, which may allow for less material (e.g., TPE, TPU) in the inner seal 170. For example, the inner seal 170 can be designed to be thinner than the embodiment of FIGS. 1-3, not having the tab 72.

As briefly explained above, another difference with the embodiment shown in FIGS. 4-5 is the integration of the upper raceway with the metal material (e.g., during stamping) of the top mount plate 160. This can provide a bearing with an upper raceway that is made of a different material than the lower raceway. This reduces overall weight of the bearing 110.

The provision of the integrated seals described above makes it possible to remove the separate upper raceway 50 and form it as part of the top mount plate 60 itself. If seals are not integrated into the top mount plate, then the cap (explained above) would be necessary for the seals. If the cap is added, then the upper raceway 50 cannot be integrated as part of the top mount plate 60.

The top mount plate 60, 160 shown in the Figures may only be a portion of the entire top mount plate. The portion illustrated may be referred to as a metal side or a steel plate side of the top mount plate. Not illustrated in these Figures is the other side of the top mount plate, which may be referred to as a rubber side. The rubber side of the top mount plate may be directly attached to the metal side, and may include a dome-shaped rubber configured for damping interaction with the vehicle body.

In one embodiment, the upper raceway 50 is separately attached to the top mount plate 60. In such an embodiment, the upper raceway 50 can be overmolded, adhered, or otherwise fixed directly to the underside of the top mount plate 60. However, it should be understood that such an arrangement is only an embodiment. In another embodiment, the top mount plate 60 is formed (e.g., stamped) to take on the shape of the upper raceway itself. In other words, the upper raceway can be an extension of the material of the top mount plate 60 and shaped to define curves that define the upper raceway of the bearing. The metal material of the top mount plate 60 can be stamped to incorporate the shape of the raceway so that no separate upper raceway 50 is necessary to be fixed to the top mount plate 60. It should be understood that additional or supplemental forming techniques (e.g., heat treatment) can be used to make the shape of the upper raceway more precise.

With the teachings explained above, the top mount plate can be a single stamped component that not only directly mounts to the vehicle frame, but also allows the removal of the cap such that the raceway can be integrated into the top mount plate. Integrated, overmolded seals on the top mount plate allow the cap to be removed from the assembly while sealing the rolling elements of the bearing. The top mount plate may be the only component of the strut bearing that is provided with overmolded features; the remaining components of the strut required for damping vibrations, supporting the shock rod, and interaction with the vehicle body can remain unchanged. Therefore, there is no concern or effect on performance of the top mount plate or vibration dampening and no design changes are necessary for remaining components of the bearing.

Further, the top raceway can be integrated directly into the top mount plate by either stamping or forming a feature into the top mount plate, or by overmolding or otherwise integrally forming the top raceway in rigid, fixed engagement with the top mount plate.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 strut bearing
11 axis
20 guidance ring
22 tab of guidance ring
24 projection
30 lower raceway
40 rolling elements
42 bearing cage
50 upper raceway
60 top mount or top mount plate
62 upper surface of top mount plate
64 lower surface of top mount plate
66 flange
68 stepped portion of top mount plate
69 aperture or groove
70 internal seal
72 tab of internal seal
80 external seal
82 location of widened material
84 contacting lip
86 deflecting lip
110 bearing
120 guidance ring
122 tab of guidance ring
150 upper raceway
160 top mount or top mount plate
170 internal seal

What is claimed is:

1. A suspension strut bearing comprising:
a top mount including a plate configured to mount to a vehicle frame;
an upper raceway on a lower side of the top mount extending about an axis;
a guidance ring configured to oscillate relative to the top mount about the axis;
a lower raceway on an upper side of the guidance ring;
a plurality of rolling elements contacting the upper raceway and the lower raceway to enable relative oscillation between the top mount and the guidance ring about the axis;
an internal seal located radially inwardly of the rolling elements; and
an external seal located radially outwardly of the rolling elements;
wherein the internal seal and the external seal are overmolded to the top mount, and wherein the internal seal includes an outwardly-projecting tab, and the guidance ring includes an inwardly-projecting tab that engages the outwardly-projecting tab to form a seal.

2. The suspension strut bearing of claim 1, wherein the external seal includes a contact lip extending downwardly and contacting the guidance ring.

3. The suspension strut bearing of claim 2, wherein the guidance ring includes a projection extending toward the top mount, the projection having a radially-inner surface contacting the lower raceway and a radially-outer surface contacting the contact lip.

4. The suspension strut bearing of claim 2, wherein the external seal includes a deflecting lip extending downwardly and not contacting the guidance ring, the deflecting lip configured to deflect external fluid away from the rolling elements.

5. The suspension strut of claim 1, wherein the external seal includes a deflecting lip extending downwardly and contacting the guidance ring.

6. The suspension strut bearing of claim 1, wherein the upper raceway is an integral feature of the top mount such that the rolling elements directly contact the top mount.

7. The suspension strut bearing of claim 6, wherein the top mount is a stamped plate and the upper raceway is stamped into the stamped plate.

8. A suspension strut bearing comprising:
a top mount including a stamped steel plate configured to mount to a vehicle frame, the stamped steel plate having a lower surface formed with a shape defining a first raceway;
a guidance ring configured to oscillate relative to the top mount about an axis;
a second raceway coupled to the guidance ring;
a plurality of rolling elements contacting the first raceway and the second raceway such that the top mount directly contacts the rolling elements; and
an internal seal located radially inwardly of the rolling elements and an external seal located radially outwardly of the rolling elements, wherein the internal and external seals are configured to fluidly isolate the rolling elements from a remainder of the suspension, wherein the external seal is overmolded onto the top mount and extends entirely through the top mount.

9. The suspension strut bearing of claim 8, wherein the top mount includes an upper surface annular and planar in shape to facilitate mounting to the vehicle frame.

10. The suspension strut bearing of claim 8, wherein the internal seal is overmolded onto the lower surface of the top mount.

11. The suspension strut bearing of claim 10, wherein the internal seal includes a contact surface that contacts a portion of the guidance ring.

12. The suspension strut bearing of claim 8, wherein the external seal includes a deflecting lip extending radially outwardly therefrom configured to deflect external fluids away from the rolling elements.

13. A suspension strut bearing comprising:
a top mount configured to mount to a vehicle frame;
a guidance ring configured to oscillate relative to the top mount about an axis;
a lower raceway disposed on an upper side of the guidance ring;
a plurality of rolling elements between the top mount and the lower raceway configured to enable relative oscillation between the top mount and the guidance ring;
an internal seal located radially inwardly of the rolling elements; and
an external seal located radially outwardly of the rolling elements;
wherein at least one of the internal seal and the external seal are overmolded to the top mount, and wherein the external seal is overmolded onto the top mount and extends entirely through the top mount.

14. The suspension strut bearing of claim 13, wherein top mount includes an integral first raceway such that the rolling elements directly contact the top mount.

15. The suspension strut of claim 14, wherein the top mount is a stamped plate and the first raceway is stamped into the stamped plate.

* * * * *